United States Patent [19]

Paige

[11] 3,817,674

[45] June 18, 1974

[54] FOOD EXTRUDING AND SPREADING APPARATUS FOR COATING FOOD PRODUCTS

[75] Inventor: James Hubert Paige, Tustin, Calif.

[73] Assignee: Logic Display Corp., Orange, Calif.

[22] Filed: Sept. 11, 1972

[21] Appl. No.: 287,743

[52] U.S. Cl................. 425/113, 425/192, 425/381
[51] Int. Cl. .............................. A23l 1/00, B29f 3/10
[58] Field of Search ........... 425/113, 467, 190, 133, 425/192, 381, 183, 382; 99/450.6; 118/404, 405, 24, 25, 30, 59

[56] References Cited
UNITED STATES PATENTS

| | | | |
|---|---|---|---|
| 2,433,140 | 12/1947 | McCaughey | 118/59 |
| 2,580,726 | 1/1952 | Brewer | 425/467 |
| 2,747,522 | 5/1956 | Newland | 425/133 X |
| 2,943,352 | 7/1960 | Van Riper | 425/113 X |
| 3,001,485 | 9/1961 | Czik | 425/190 X |
| 3,045,281 | 7/1962 | Skobel | 425/113 |
| 3,295,160 | 1/1967 | Schippers | 425/382 X |
| 3,614,885 | 10/1971 | Eppler | 425/467 X |

Primary Examiner—J. Spencer Overholser
Assistant Examiner—David S. Safran
Attorney, Agent, or Firm—Pastoriza & Kelly

[57] ABSTRACT

Apparatus for making an edible unit is structured so that a covering of mouldable food product can be extruded through an annular die orifice and onto an elongated firm food item being progressively urged through the die orifice by a reciprocal pusher rod. The mouldable food product may be potatoe meal and the firm food item may be a weiner so that the resulting edible unit is a weiner wrapped in a blanket of potatoe that may thereafter be cooked.

The pusher rod thrusts a weiner through a tubular guide while traveling between its retracted and extended positions as the weiner is being covered by potatoe meal. The die assembly can be quickly removed from the apparatus for cleaning or replacement purposes and the annular die orifice can be varied to correspondingly vary the thickness of the potatoe meal.

2 Claims, 5 Drawing Figures

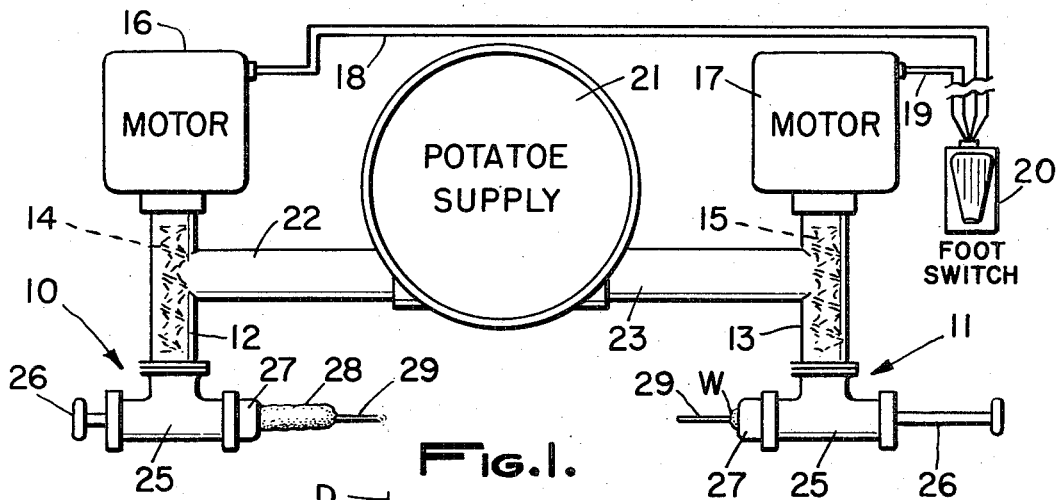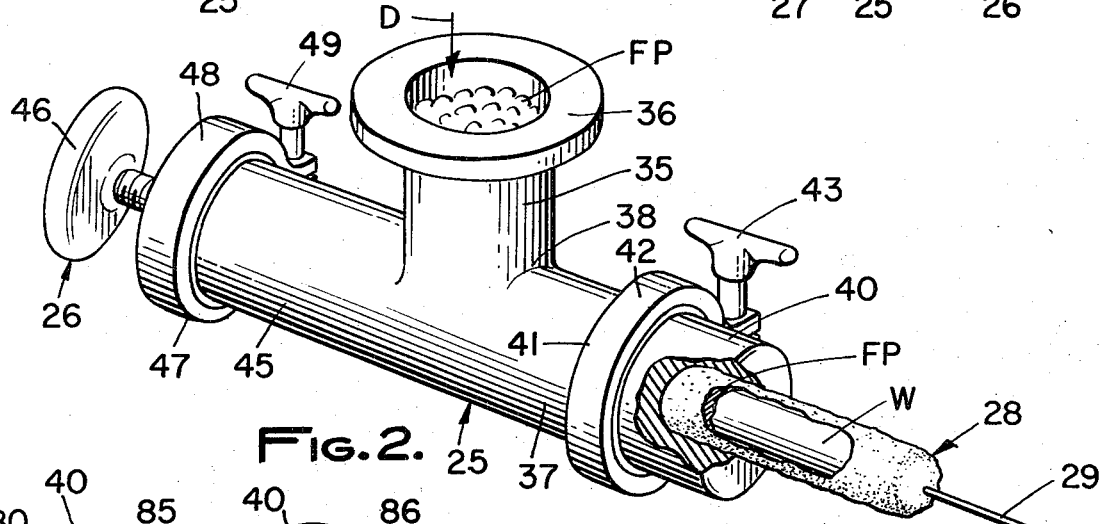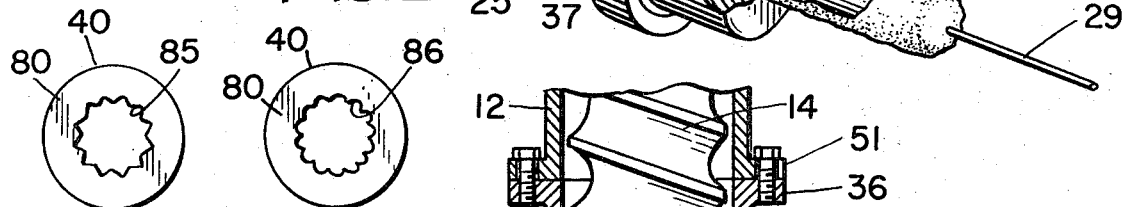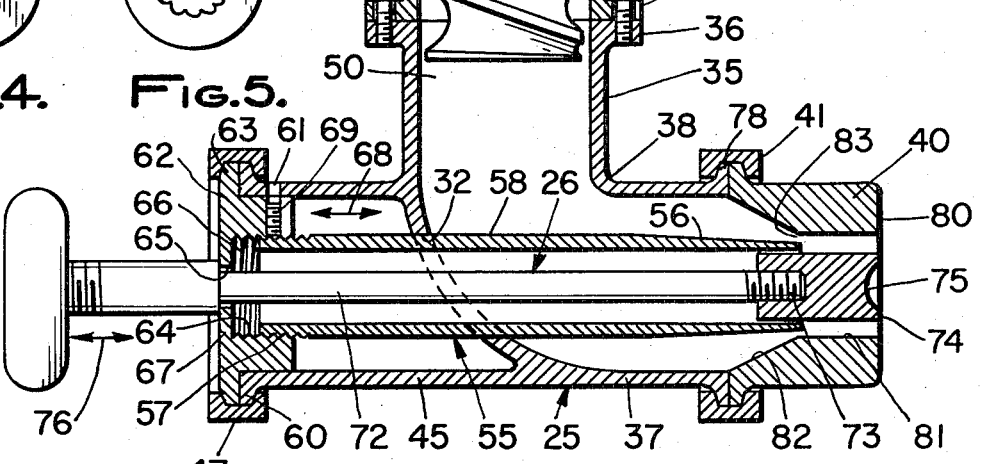

FOOD EXTRUDING AND SPREADING APPARATUS FOR COATING FOOD PRODUCTS

BACKGROUND OF THE INVENTION

This invention relates to food handling equipment and more specifically to apparatus capable of extruding a coating of mouldable food product onto a relatively firm food item.

This invention is essentially an improvment over the "machine for making an edible product" described in U.S. Pat. No. 2,747,522 to Newland granted May 29, 1956.

Conventional devices for extruding a coating of pliable meal onton a weiner or the like have a number of general drawbacks. The internal mechanism requires frequent servicing and cleaning to meet rigorous health standards and conventional devices cannot be quickly dismantled for easy and repeated access. Moreover, these conventional devices have fixed or integral extrusion die heads so that only a single design or pattern can be impressed in the mouldable food product.

It is often desirable to vary the thickness of the coating or blanket surrounding the weiner or the like but when the dimensions of the annular die orifices are fixed then admustment or variation is not possible.

This invention aims to overcome a number of the foregoing and additional problems encountered by conventional food extruding devices.

BRIEF SUMMARY OF THE INVENTION

Briefly stated, this invention comprehends a food handling device for easily and efficiently making an edible food unit characterized by a relatively firm food item surrounded and blanketed by a mouldable food product.

In its broader aspects this invention includes a housing having an annular passageway defined by an inlet wall section, a forwardly extending exit wall section and an intermediate curved wall section formed with an opening. Adjacent to the housing inlet wall section is a hopper through which a feeder means can drive a supply of mouldable food product into the housing annular passageway. Supported in part by the periphery described by the opening of the housing intermediate curve wall section is a tubular guide having a forward portion, a rearward portion and an intermediate portion.

A reciprocal pusher rod is disposed partially within the tubular guide and has a rearward end projecting beyond the tubular guide rearward portion and the forward end capable of being slidably moved between a retracted position and an extended position. A die is removeably clamped to the housing exit wall secton and is arranged to generally surround the tubular guide to constitute therewith an annular die orifice. Mouldable food product may be extruded through the annular die orifice and spread over a relatively elongated firm food item being pushed forwardly through the annular die orifice by the pusher rod.

Preferably the interior periphery of the die has a generally cylindrically shaped forward segment and a backwardly diverging conically shaped rearward segment. The forward die segment may be a smooth bore or may be characterized by an irregular shape such as as serrated or scalloped. A quick disconnect clamp couples the die to the housing exit wall section so the die may be quickly removed for servicing and for replacement.

Adjustment means is provided for varying the thickness of the annular die orifice so that the thickness of the mouldable food product will likewise be varied. The adjustment means includes a repositioning means for displacing the tubular guide rearwardly or forwardly to enlarge or diminish the annular die orifice respectively.

The apparatus also includes a rearwardly directed mounting extension connected to the housing and coaxially aligned with the housing exit wall section. A cover plate is removably clamped to the mounting extension and has a central hole and concentric recess formed in its interior face. The tubular guide rearward portion is seated within the cover plate recess and the central hole serves as a bearing for the pusher rod. A quick disconnect clamp couples the cover plate to the mounting extension so the cover plate can be quickly removed for access into the mounting extension.

A plurality of these food extruding and spreading apparatus may be linked to a single source of pressurized mouldable food products.

BRIEF DESCRIPTION OF THE DRAWINGS

The numerous benefits and unique aspects of the present invention will be fully understood when the following detailed description is studied in conjunction with the drawings in which:

FIG. 1 is a schematic view, showing a couple of food extruding and spreading apparatus assemblies arranged to be supplied with pressurized mouldable food product from a common source;

FIG. 2 is a perspective, partially sectional view of a food extruding and spreading apparatus constructed in accordance with this invention, showing a weiner surrounded by a coating of potatoe meal;

FIG. 3 is a side elevational sectional view of a food extruding and spreading apparatus constructed in accordance with this invention;

FIG. 4 is a front elevational view of the die having a serrated interior; and,

FIG. 5 is a front elevational view of the die with its interior wall scalloped.

DETAILED DESCRIPTION OF THE PREFERRED EMBODIMENT

Referring primarily to FIG. 1, a food extruding and spreading apparatus 1o is shown generally aligned with another essentially identical food extruding and spreading apparatus 11. They are coupled to laterally extending hoppers 12 and 13 respectively which contain feedscrews 14 and 15 that may be caused to selectively rotate by energizing motors 16 and 17 respectively. The motors 16 and 17 are wired by electrical lines 18 and 19 to a manual switch 20 which, for purposes of illustration, is shown as a foot pedal switch. Both motors 16 and 17 may be simultaneously operated by switch 20 and or may be operated by separate switches.

A single source of supply 21 is linked to the hoppers 12 and 13 by a pair of branch conduits 22 and 23 respectively. The source of supply 21 may be constructed and pressurized in a manner similar to that of a conventional sausage stuffer. The mouldable food product contained within the source of supply 21 is maintained under a controlable amount of pressure sufficient to thrust the mouldable food product outwardly through branch conduits 22 and 23 so that the feed-screws 14 and 15 may thereafter drive the mouldable food product into the food extruding and spreading apparatus 10 and 11.

The apparatus 10 and 11 are essentially identical and therefore a full description of one will suffice for a complete understanding of both. Each has a housing 25 within which travels a reciprocal pusher rod 26. Attached to the forward end of the housing 25 is a removable die 27. An edible food unit 28 with a skewer 29 or stick handle is shown projecting outwardly from apparatus 10. The reciprocable pusher rod 26 used in conjunction with the apparatus 11 is shown substantially fully retracted with a weiner projecting slightly outwardly from the associated die 27.

Referring now to FIG. 2 the housing 25 has an inlet wall section 35 that terminates in a flange 36 which may be coupled to its associated hopper. The housing 25 has an exit wall section 37 whose axis is aligned generally perpendicular to the axis of the inlet wall section 35. An intermediate curved wall section 38 merges with and joins together wall sections 35 and 36. Removably secured to the front end of the exit wall section 37 is a generally torus shaped die 40 that can be assembled or dismantalled by way of a quick disconnect clamp 41. The clamp 41 has a split collar 42 and a locking lever 43 which when released will permit the die 42 to be withdrawn.

Extending rearwardly from housing 25 is a hollow mounting extension 45 of circular cross section and which is coaxially aligned with the housing exit wall section 37. The rearward portion of the pusher rod 26 terminates in a manually operable knob 46. A quick disconnect clamp 47 is secured to mounting extension 45 and, like the forward quick disconnect clamp 41, has a split section collar 45 and a locking lever 43.

Mouldable food product FP is driven into the inlet wall section 35 as indicated by directional arrow D and routed to the housing 25 until extruded through the die 40 in a manner to be fully described. The mouldable food product FP is eventually extruded and deposited as a blanket over the weiner W to constitute the edible food unit 28.

The food product FP to be extruded is mixed and otherwise treated to a mouldable consistency so that it may be formed into the desired shape. By way of example the food product FP may be in the form of potatoe meal, corn meal, bread dough, sweet dough etc. Instead of a weiner W the elongated relatively firm food item to be coated may be fish, hamburger, fowl, beef, etc. Any combination of compatible and desirable mouldable food and relatively firm food is in the framework of this invention. The specific combination of potatoe meal and a weiner was chosen primarily for purposes of explaining the construction and operation of the food extruding and spreading apparatus.

Referring now essentially to FIG. 3, it can be seen that the housing 25 defines a generally annular passageway 50 whose axis bends through an arc of approximately 90°. The housing inlet wall section 35 extends relatively upwardly and laterally from the axis of the pusher rod 26. The hopper 12 is coaxially aligned with inlet wall section 35 and is secured thereto by way of bolts extending through the hopper flange 51 and housing flange 36.

The relatively wide bend portion of intermediate curved wall section 38 is formed with a hole 52 whose periphery or edge aids in aligning and supporting a tubular guide 55.

The tubular guide 55 has a forward portion whose wall generally tapers in a forward direction, a rearward portion 52 whose external periphery is threaded, and, an intermediate portion 58 seated on the edge defined by hole 52. The mounting extension 45 terminates rearwardly in a flange 60 and has a hole 61 extending entirely through a side wall portion.

A cover plate 62 is removably secured to the mounting extension 45 by way of the rearward quick disconnect clamp 47. The disc shaped cover plate 62 is formed on its interior or concealed face with a threaded recess 64 which is threadably interengaged with the tubular guide rearward portion 57. The cover plate 62 is also formed with a central bore 65 which serves as a bearing for the slidable motion of pusher rod 26. The length of the cavity or space 66 represents the rearward axial displacement through which the tubular guide 55 may be moved. Tubular guide 55 may be moved forwardly or rearwardly as indicated by arrow 68 for the purpose of varying the size of an annular die orifice as shall be more fully explained. A set screw 69 threadably engaged in hole 61 may be released in order to reposition tubular guide 55 and then retightened in order to firmly fix the new desired position of tubular guide 55.

The pusher rod 26 has a rearward 72 disposed in central bore 65 and a forward portion 73 that includes an enlarged slide block 74 whose diameter is slightly less than that of the internal diameter of tubular guide 55. The front face of slide block 74 is formed with a concave area 75 for better positioning and engaging an elongated food item such as a weiner. The pusher rod 26 may be moved between a fully retracted position (similar to that on the right hand side of FIG. 1) and a forwardly extended position as shown. Axial movement of the pusher rod 26 is indicated by directional arrow 76.

The forward quick disconnect clamp 41 releasably holds die 40 in position by surrounding a portion of housing flange 78 and an adjacent flange of die 40. The exit end or nozzle 80 of die 40 is shown in substantially coplanar relationship with the forward face of slide block 74 shown in an extreme forward position. The interior periphery of the die 40 has a relatively smooth bore, cylindrically shaped forward segment 81 and a backwardly diverging, conically shaped rearward segment 82.

An annular die orifice 83 is constituted by the space defined between die 40 and tubular guide 55. Adjustment means is provided for varying the thickness or width of the annular die orifice 83. In essence the adjustment means is characterized by the coaction of tubular guide 55 and cover plate 62 that are threadably interengaged. The tubular guide 55 can be rotated and moved axially, rearwardly or forwardly as indicated by directional arrow 68 to thereby enlarge or narrow the width of the annular die orifice 83. By varying the width of the annular die orifice 83 the thickness of the mouldable food product coating or blanket can be made thicker or thinner.

The die 40 may be easily uncoupled from housing 25 by unlocking the quick disconnect clamp 41. The forward interior area of housing 25 along with tubular guide 55 may then be cleaned and otherwise serviced.

The same or a different die 40 may be reassembled to the housing 25.

For various reasons it may be desirable to impress a design into the exterior surface of the mouldable food product covering. In this regard FIG. 4 shows an interchangeable die 40 whose interior periphery 85 is serrated and FIG. 5 shows and interchangeable die 40 whose interior periphery 86 is scalloped. Other configurations of ribs or splines may be cut onto the interior periphery of a die.

OPERATION

Keeping the above construction in mind it can be understood how many of the previously described disadvantages of conventional food extruding devices are overcome or substantially eliminated by the present invention.

The food extruding and spreading apparatus assemblies 10 and 11 may be operated to simultaneiously or intermittently dispense edible food units 28 that can be thereafter individually cooked or deep fat fried to produce a delicious, handy and somewhat amusing "Dinner-on-a-stick." The source of supply 21 is pressurized to constantly urge mouldable food product outwardly through the conduits 22 and 23 so that the food product may be conveyed by the feed-screws 14 and 15 to their associated food extruding and spreading apparatus assemblies 10 and 11. By operating one or more manual switches 20 then one or more of the feed-screws may be caused to operate.

The width of the food product coating or blanket is predetermined by regulating the width of the annular die orifice 83. The annular die orifice 83 may be adjusted by axially repositioning the tubular guide 55 relative to the cover plate recess 64. The orifice 83 may be varied to eliminate or minimize flow impedance of the mouldable food product FP chosen to be of maximum compatibility with the particular elongated firm food item whose texture or consistency may be varied.

Prior to inserting a weiner W or the like into the tubular guide 55, the pusher rod 26 is drawn to its fully retracted position. With the concave area 75 of slide block 74 engaging the weiner W the pusher rod 26 is gradually urged toward its extended position as a blanket of mouldable food product FP is extruded through the annular die orifice 83 directly onto the weiner W. After the weiner W is completely surrounded by a coating of the mouldable food product FP, the resulting edible food unit 28 is withdrawn and the cycle is repeated.

The die 40 can be quickly uncoupled from housing 25 for cleaning purposes and also for replacement purposes. With the die 40 removed a person may more easily gain access to the tubular guide 55 to reposition it and thereby vary the size of the annular die orifice 83.

From the foregoing it will be evident that the present invention has provided a food extruding and spreading apparatus in which all the various advantages are fully realized.

I claim:

1. Food extruding and spreading apparatus, comprising:
   a. a housing having an annular passageway defined by an inlet wall section, a forwardly extending exit wall section, and an intermediate curved wall section formed with an opening;
   b. a hopper adjacent to the housing inlet wall section;
   c. a source of pressurized mouldable food product in communication with the hopper;
   d. feeder means arranged to drive a supply of mouldable food product through the hopper and into the housing inlet wall section;
   e. a tubular guide having a forward portion, a rearward portion and intermediate portion supported in part by the periphery described by the opening of the housing intermediate curved wall section;
   f. a reciprocable pusher rod disposed partially within the tubular guide and having a rearward end projecting beyond the tubular guide rearward portion and a forward end capable of being slidably moved between a retracted position and an extended position beyond the tubular guide forward end;
   g. a die removably clamped to the housing exit wall section and arranged to generally surround the tubular guide to constitute therewith an annular die orifice;
   h. a forward segment of the die having an interior periphery that is generally cylindrically shaped and a rearward segment of the die that is generally backwardly diverging and of conical shape, the die forward segment being irregularly shaped in cross section so that the exterior surface of the mouldable food covering will have a design;
   i. a quick-disconnect clamp coupling the die to the housing exit wall section so that the die may be quickly removed for servicing and/or replacement;
   j. adjustment means for varying the thickness of the annular die orifice, the adjustment means including a repositioning means for displacing the tubular guide rearwardly or forwardly to enlarge or diminish the die orifice respectively;
   k. a rearwardly directed mounting extension connected to the housing and coaxially aligned with the housing exit wall section;
   l. a cover plate removably clamped to the mounting extension and having a central hole and a concentric recess formed in its exterior face, the tubular guide rearward portion being seated within the cover plate recess and the central hole being arranged to serve as a bearing for the pusher rod - and - the external periphery of the tubular guide rearward portion and the cover plate recess being threadably interengaged so the tubular guide can be axially displaced and repositioned to thereby vary the thickness of the annular die orifice;
   m. a quick disconnect clamp coupling the cover plate to the mounting extension so the cover plate can be quickly removed for access into the mounting extension;
   n. a pusher rod forward end including a slide block with a concave area formed in its front face to better engage the relative firm food item;
   o. a manually operable knob attached to the pusher rod rearward end;
   p. plural units of food extruding and spreading apparatus structured to operate simultaneously or independently;
   wherein, mouldable food product under pressure may selectively be extruded through an annular die orifice and thread over a relatively firm food item being pushed forwardly through the annular die orifice by an associated pusher rod.

2. The structure according to claim 1, wherein; the irregular cross sectional shape is serrated or scalloped.

* * * * *